United States Patent
Tsai

(10) Patent No.: US 8,374,427 B2
(45) Date of Patent: Feb. 12, 2013

(54) IMAGE PROCESSING METHOD AND IMAGE PROCESSING SYSTEM

(75) Inventor: Chi Yi Tsai, Taipei (TW)

(73) Assignee: Asustek Computer Inc., Taipei (TW)

( * ) Notice: Subject to any disclaimer, the term of this patent is extended or adjusted under 35 U.S.C. 154(b) by 427 days.

(21) Appl. No.: 12/797,158

(22) Filed: Jun. 9, 2010

(65) Prior Publication Data

US 2010/0316289 A1 Dec. 16, 2010

(30) Foreign Application Priority Data

Jun. 12, 2009 (TW) .............................. 098119635 A

(51) Int. Cl.
*G06K 9/40* (2006.01)
(52) U.S. Cl. ........................................ 382/167; 382/274
(58) Field of Classification Search ........................ None
See application file for complete search history.

(56) References Cited

U.S. PATENT DOCUMENTS

| | | | | |
|---|---|---|---|---|
| 4,812,902 A * | 3/1989 | Fuchsberger | ................ | 358/521 |
| 5,014,127 A * | 5/1991 | Richards | .................... | 348/384.1 |
| 5,489,998 A * | 2/1996 | Yamada et al. | ............. | 358/523 |
| 5,544,284 A * | 8/1996 | Allebach et al. | ............. | 345/603 |
| 5,565,931 A * | 10/1996 | Girod | ............................ | 348/675 |
| 5,629,720 A * | 5/1997 | Cherry et al. | ................. | 345/601 |
| 6,944,335 B2 * | 9/2005 | Pettigrew et al. | ............. | 382/167 |
| 7,215,813 B2 * | 5/2007 | Graves et al. | ................ | 382/167 |
| 7,251,057 B2 * | 7/2007 | Tsujino et al. | ................ | 358/1.9 |
| 7,274,491 B2 * | 9/2007 | Yamada et al. | ............. | 358/3.06 |
| 7,847,973 B2 * | 12/2010 | Schoner | ......................... | 358/1.9 |
| 7,965,429 B1 * | 6/2011 | Briggs et al. | ................. | 358/518 |
| 8,064,693 B2 * | 11/2011 | Ozdemir | ....................... | 382/167 |
| 8,154,563 B2 * | 4/2012 | Park et al. | ..................... | 345/602 |
| 2002/0196483 A1 * | 12/2002 | Tsujino et al. | ............... | 358/520 |
| 2003/0234795 A1 * | 12/2003 | Lee | ............................... | 345/601 |
| 2006/0158564 A1 * | 7/2006 | Miyazawa | ..................... | 348/650 |
| 2008/0080784 A1 * | 4/2008 | Ozdemir | ....................... | 382/274 |
| 2008/0181532 A1 * | 7/2008 | Kim et al. | ..................... | 382/274 |
| 2010/0007773 A1 * | 1/2010 | O'Connell et al. | ........... | 348/239 |
| 2010/0201848 A1 * | 8/2010 | Fukui | ............................ | 348/234 |
| 2010/0316289 A1 * | 12/2010 | Tsai | ............................. | 382/165 |
| 2011/0235702 A1 * | 9/2011 | O'Connell et al. | ....... | 375/240.02 |
| 2011/0249756 A1 * | 10/2011 | Doepke | .................... | 375/240.24 |
| 2012/0051636 A1 * | 3/2012 | Greenebaum et al. | ........ | 382/167 |
| 2012/0229677 A1 * | 9/2012 | Ugawa et al. | .................. | 348/234 |

FOREIGN PATENT DOCUMENTS

| CN | 1809174 A | 7/2006 |
|---|---|---|
| CN | 101042852 A | 9/2007 |
| CN | 101197126 A | 6/2008 |

* cited by examiner

*Primary Examiner* — Chan S Park
*Assistant Examiner* — Sean Motsinger
(74) *Attorney, Agent, or Firm* — Muncy, Geissler, Olds & Lowe, PLLC

(57) ABSTRACT

An image processing method and an image processing system adapted to processing image information with multiple process pixels are disclosed. The image processing method includes steps of: setting a group of parameters; establishing a luminance lookup table; establishing a chrominance-luminance lookup table; retrieving the image information; determining a format of the image information; and if the format of the image is a first format, utilizing the chrominance-luminance lookup table to generate an adjusted chrominance and a first adjusted luminance corresponding to one of the process pixels; if the format of the image is a second format, utilizing the chrominance-luminance lookup table and the luminance lookup table to generate an adjusted chrominance, a first adjusted luminance, and a second adjusted luminance corresponding to one of the process pixels.

19 Claims, 2 Drawing Sheets

IMAGE PROCESSING METHOD AND IMAGE PROCESSING SYSTEM

CROSS REFERENCE TO RELATED APPLICATIONS

This Non-provisional application claims priority under 35 U.S.C. §119(a) on patent application No(s). 098119635 filed in Taiwan, Republic of China on Jun. 12, 2009, the entire contents of which are hereby incorporated by reference.

BACKGROUND OF THE INVENTION

1. Field of Invention

The invention relates to an image processing method and an image processing system and, more particularly, to an image processing method and an image processing system performed by a looking up table (chrominance-luminance lookup table, luminance lookup table).

2. Related Art

With the progress of digital image display techniques, electronic display devices with high definition, high stableness, and multi-functions are widely used in people's daily life. Digital electronic devices such as a liquid crystal display (LCD) screen, a plasma display and a projector become to be main media in people's life for getting information or communicating with each other.

The key factor which affects the display quality includes a luminance contraction and a color saturation of an image. Generally, the contraction means the luminance difference between a bright area and a dark area in the image, and enhancing contraction properly may make a user feel agreeable. The color saturation is determined by the chrominance of various kinds of colors.

The conventional image contraction and color enhancement are performed in the RGB color space format. However, the current formats of the images in most images or the video streams do not use the RGB color space, they use the YCbCr color space format which separates the luminance and the chrominance to store the information or transmit information. That is, conventionally, the images or video streams with YCbCr image format may need to be converted to the RGB image format first, and then they are performed to enhance the contraction or the saturation. Even after the image is processed, the RGB image format needs to be reconverted to the YCbCr image format for adapted to the display system. Therefore, additional color space conversion is a load to the system, and the video stream cannot be processed instantly.

In another aspect, in the image contraction and saturation enhancement to the YCbCr image format images, since the YCbCr image format has a luminance component (Y) and two color components (Cb and Cr), the image processor may establish a luminance lookup table (LUT) to adjust the luminance component (Y), and it also may establish one or more chrominance luminance lookup table to adjust the chrominance components (Cb and Cr) according to the requirement in enhancing chrominance. However, in each image processing flow path, each component (Y, Cb or Cr) in the image information are adjusted according to the luminance lookup table or the chrominance LUT, and that means the components need to be calculated for three times. Therefore, the troublesome calculation is a heavy load to the system without independent image processor.

SUMMARY OF THE INVENTION

The invention discloses an image processing method adapted to processing image information, and the image information with multiple process pixels.

According to an embodiment of the invention, the image processing method includes the following steps: a) setting a group of parameters; b) establishing a luminance lookup table according to the group of parameters; c) establishing a chrominance-luminance lookup table according to the parameters and the luminance lookup table; d) retrieving the image information; e) determining a format of the image information; f) generating an adjusted chrominance and a first adjusted luminance corresponding to one of the process pixels using the chrominance-luminance lookup table if the format of the image is a first format (for example, the YCbCr is 4:2:2); and g) generating an adjusted chrominance, a first adjusted luminance and a second adjusted luminance corresponding to one of the process pixels using the chrominance-luminance lookup table and the luminance lookup table if the format of the image is a second format (for example, the YCbCr is 4:2:0).

The invention also discloses an image processing system including a memory module, a calculating module and a processing module. The calculating module and the processing module are electrically connected to the memory module, respectively.

According to an embodiment of the invention, the memory module stores image information, and the image information with multiple process pixels. The calculating module establishes a luminance lookup table according to a group of parameters, and then the calculating module establishes a chrominance-luminance lookup table according to the parameters and the luminance lookup table, and stores the luminance lookup table and the chrominance-luminance lookup table in the memory module.

The processing module retrieves the image information from the memory module and determines the format of the image information. If the format of the image is a first format, the processing module uses the chrominance-luminance lookup table stored in the memory module to generate an adjusted chrominance and a first adjusted luminance corresponding to one of the process pixels. If the format of the image is a second format, the processing module uses the chrominance-luminance lookup table and the luminance lookup table stored in the memory module to generate an adjusted chrominance, a first adjusted luminance and a second adjusted luminance corresponding to one of the process pixels.

That is, in the image processing method and the image processing system of the invention, by establishing the luminance-chrominance LUT, the luminance and the chrominance of the image can be adjusted only via a single calculation procedure. Therefore, the image processing time is shorted, and the flow path is simplified.

These and other features, aspects and advantages of the present invention will become better understood with regard to the following description, appended claims, and accompanying drawings.

DETAILED DESCRIPTION OF THE INVENTION

Figure 1:
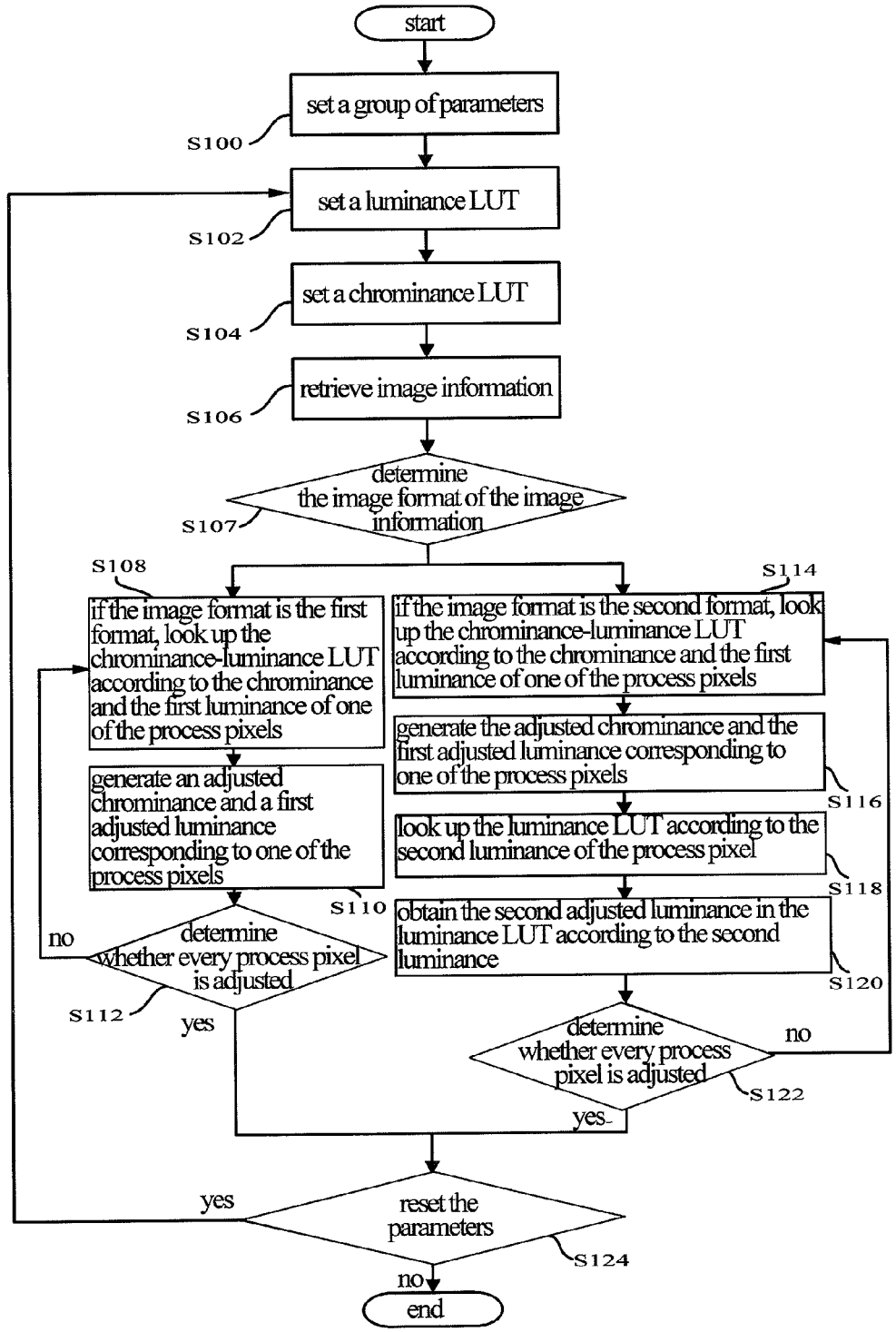
FIG. 1 is a flow chart diagram showing the image processing method in an embodiment of the invention.
Figure 2:
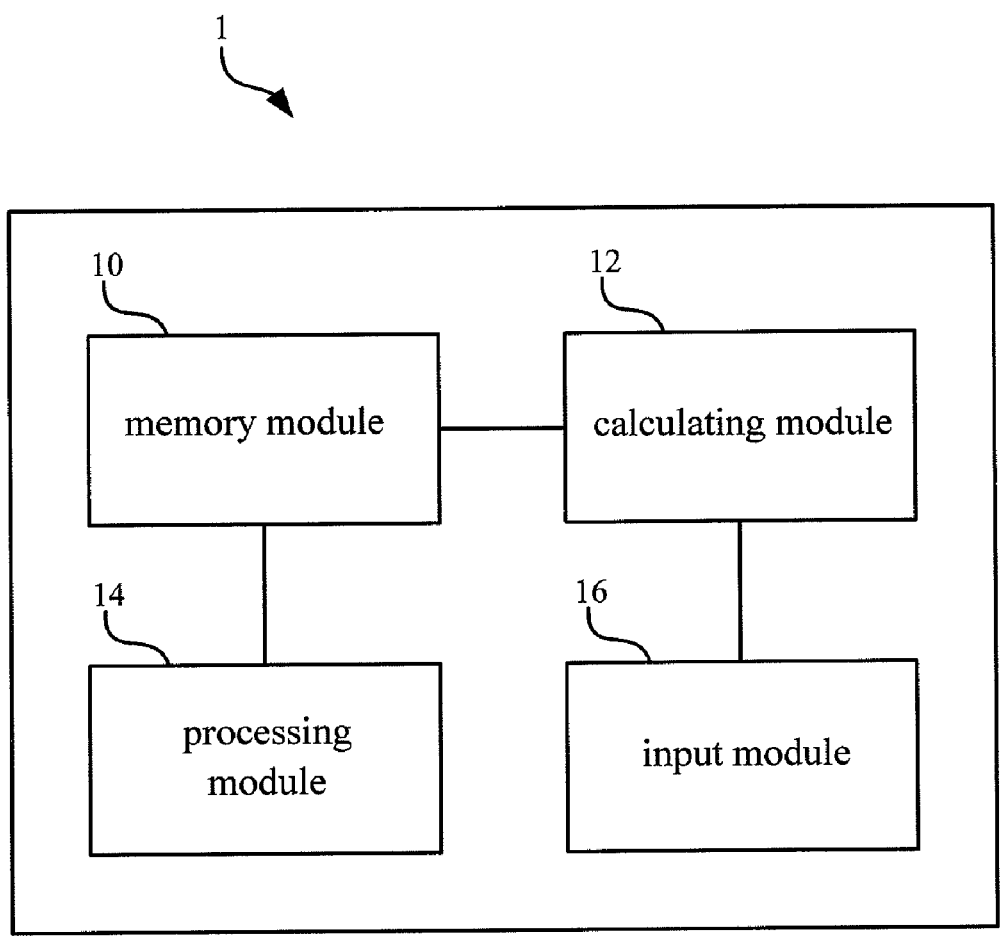
FIG. 2 is a functional block diagram showing an image processing system which can perform the image processing method in the invention.

FIG. 1 is a flow chart diagram showing the image processing method in an embodiment of the invention. FIG. 2 is a functional diagram showing the image processing system 1 which can perform the image processing method in an embodiment of the invention. The image processing method and the image processing system are adapted to processing image information (such as an image, a multi-media movie or a video stream). The image information has a format of the image. As shown in FIG. 2, in the embodiment, the image processing system 1 includes a memory module 10, a calculating module 12, a processing module 14 and an input module 16. The calculating module 12 and the processing module 14 are electrically connected to the memory module 10, respectively. The input module 16 is electrically connected to the calculating module 12. The memory module 10 stores the image information including multiple process pixels.

In the embodiment, the image processing method and the image processing system 1 may process images having different format of the images. In practical usage, the common format of the images may be divided into YCbCr 4:4:4 (it means that the YCbCr format of the color space is used and the sampling ratio is 4:4:4, which is completely sampled), YCbCr 4:2:2 (it means that the YCbCr format of the color space is used and the sampling ratio 4:2:2, which is partially sampled), YCbCr 4:2:0 (it means that the YCbCr format of the color space is used and the sampling ratio 4:2:0 or 4:1:1, which is partially sampled) and other types.

Taking the common YCbCr 4:2:2 format of the image as an example, it includes YUY2, UYVY, and YUV2 formats and so on. The common YCbCr 4:2:0 format of the image includes YV2, NV12 formats and the I420 format adapted to the digital video disk (DVD).

In the image information, the minimum unit image is pixel, and in the YCbCr 4:4:4 format of the image (completely sampled), each pixel has three complete components (Y, Cb and Cr). To satisfy the compression or image processing requirement, in the YCbCr 4:2:2 or the YCbCr 4:2:0 format of the image, the adjacent multiple pixels are defined as a macro pixel and the macro pixel is defined according to different formats. For example, it may be two adjacent pixels or 2*2 adjacent pixel areas.

Generally, in the YCbCr 4:2:2 format, a macro pixel may be composed of the Y component (Y1) of the first pixel, the Cb component (Cb1) of the first pixel, the Y component (Y2) of the second pixel and the Cr component (Cr2) of the second pixel. Namely, in each macro pixel of the YCbCr 4:2:2, the luminance and the chrominance are 1:1 (two luminances and two chrominances). In practical usage, to facilitate the processing, in the YCbCr 4:2:2 format, a macro pixel [Y1, Cb1, Y2, and Cr2] is usually divided to two process pixels a processing pixel [Y1, Cb1] and another process pixel [Y2, Cr2]. In the embodiment, the processing module takes a process pixel as a basic unit to process and adjust the image.

In another aspect, in the YCbCr 4:2:0, a macro pixel may be composed of four different Y components (Y1, Y2, Y3 and Y4), a Cb component, and a Cr component (therefore, the sampling ratio of the YCbCr 4:2:0 format also may be called 4:1:1). That is, in each macro pixel of the YCbCr 4:2:0, the luminance and the chrominance is 2:1 (four luminances and two chrominances). In practical usage, to facilitate the processing, in the YCbCr 4:2:0 format, a macro pixel [Y1, Y2, Y3, Y4, Cb, and Cr] is usually divided into two processing pixels. In the embodiment, the two processing pixels are a process pixel [Y1, Y2, and Cb] and another process pixel [Y3, Y4, and Cr].

As shown in FIG. 1 and FIG. 2, step S100 is firstly performed to set a group of parameters. In the embodiment, the parameter may be generated automatically by a calculating module 12, or it may be inputted by the user via an input module 16 and transmitted to the calculating module 12, which is not limited thereto. In the embodiment, the parameters may be (St, Sa), and St$\in$[0,1], Sa$\geq$0, and the parameters may be set according to the practical requirements, and it also may be adjusted according to the quality of the image processing result.

Then, step S102 is performed. The calculating module 12 generates a luminance lookup table according to the parameters. In the embodiment, the calculating module 12 may store the luminance lookup table in the memory module 10. In the embodiment, the luminance of the image information of the invention is stored in an 8 bits mode, and the luminance is divided to 256 classes (the luminance is distributed in 0~255). In the embodiment, the luminance lookup table is generated according to the formula herein below:

$$Yout(x)=Bound[f_y(St,f(x))x-b_y(St,f(x))]_{min}^{max}, \text{ wherein}$$
$x$ is an integer between 0 and 255, $f_y(St,f(x))=St \times f(x)+(1-St)$  $b_y(St,f(x))=16 \times St \times (f(x)-1)$, wherein $f(x)$ is a non-liner function for generating a gain value corresponding to the input signal. For example, $f(x)=[255(x/255)^r+1]/(x+1)$, $r>0$. The equation $f(x)$ may be adjusted according to practical usage. The Bound function is defined as: $B=Bound[A]_{min}^{max}$. When the min$\leq$A$\leq$max, B=A; when A$\leq$min, B=min; when max$\leq$A, B=A. wherein 0$\leq$min<max, and in the embodiment, the max value may be 255 or 235, and the min value may be 0 or 16.

In the embodiment, the format of the luminance lookup table may be shown herein below:

TABLE 1

| Input luminance | Output luminance |
| --- | --- |
| 0 | Yout[0] |
| 1 | Yout[1] |
| . | . |
| . | . |
| . | . |
| 255 | Yout[255] |

Then, step S104 is performed. The calculating module 12 may establish a chrominance-luminance lookup table according to the parameters and the luminance lookup table. In the embodiment, the calculating module 12 also may store the luminance lookup table in the memory module 10. The chrominance-luminance lookup table is generated according to the parameters and the luminance lookup table. In another aspect, the luminance of the image information in the invention also may be stored in the 8 bits mode, and the luminance is divided into 256 classes (the chrominance Cb and Cr are distributed between 0 and 255). In the embodiment, the luminance lookup table is generated according to the following formula:

$$CYout(x,y)=Bound[f_C(St,Sa,f(x))y-b_C(St,Sa,f(x))]_{min}^{max} \times 256+Yout(x)$$

Wherein $x$ is an integer between 0 and 255, and $y$ is an integer between 0 and 255.

$f_C(St,Sa,f(x))=Sa \times St \times f(x)+(1-St)b_C(St,Sa,f(x))=128 \times St \times (Sa \times f(x)-1)$, and $f(x)$ is a non-liner function for generating a gain value corresponding to the input signal.

In the embodiment, the chrominance-luminance lookup table format may be shown in table 2 as follows:

TABLE 2

| Input chrominance-luminance(C, Y) | Output chrominance-luminance |
|---|---|
| 0, 0 | CYout[0, 0] |
| 0, 1 | CYout[0, 1] |
| . | . |
| . | . |
| . | . |
| 255, 255 | CYout[255, 255] |

That is, for example, when a luminance and a chrominance need to be looked up via the chrominance-luminance lookup table in the invention, a corresponding group of luminance and chrominance are found in a single search process.

Then, step S106 is performed to retrieve the image information from the memory module 10 using the processing module 14. Afterwards, step S107 is performed to determine the format of the image information using the processing module 14.

In the embodiment, when the format of the image information is determined to be the first format, in the image processing method, step S108 is performed, and the first format herein is the YCbCr 4:2:2, which is the YCbCr color space, and the YCbCr sampling ratio is 4:2:2. The image information of the first format with multiple pixels (such as 1024*768 pixels), and two adjacent pixels correspond to a macro pixel.

To facilitate the processing, each macro pixel may be composed by two process pixels, and each process pixel includes a chrominance and a first luminance. In step S108, the processing module 14 looks up the chrominance-luminance lookup table stored in the memory module 10 according to the chrominance and the first luminance of one of the process pixels. Then, step S110 is performed, and the processing module 14 obtains the adjusted chrominance and the first adjusted luminance corresponding to the chrominance and the first luminance from the chrominance-luminance lookup table, and then the chrominance and the luminance corresponding to a process pixel are adjusted.

Then, step S112 is performed. The processing module 14 determines whether each process pixel of the image information is adjusted. If not, step S108 to step S110 are performed repeatedly to adjust all the process pixels in the image information.

In the image processing method of the prior art, the luminance is adjusted by looking up the luminance lookup table, and the chrominance is adjusted by looking up the chrominance LUT. In the image processing method of the invention, via the chrominance-luminance lookup table, the luminance and the chrominance may be adjusted in a single flow path, and thus the image processing speed is improved.

On the other hand, when the format of the image information is determined to be the second format, step S114 of the image processing method in the invention is performed. The second format herein may be YCbCr 4:2:0, which is the YCbCr color space, and the YCbCr sampling ratio is 4:2:0 or 4:1:1. The image information with the second format with multiple pixels, and the four adjacent pixels of the second format correspond to a macro pixel.

To facilitate the processing, each macro pixel is formed by two process pixels, and each process pixel in the image information of the second format includes a chrominance, a first luminance and a second luminance. Step S114 is performed, and the processing module 14 looks up the chrominance-luminance lookup table stored in the memory module 10 according to the chrominance and the first luminance of one of the process pixels. Then, step S116 is performed, and the processing module obtains the adjusted chrominance corresponding to the chrominance and the first adjusted luminance corresponding to the first luminance from the chrominance-luminance lookup table. Then, step S118 is performed, and the processing module 14 looks for the luminance lookup table according to the second adjusted luminance of one of the process pixels, thereby adjusting the chrominance and luminance of the process pixel. Afterwards, in step S120, the processing module 14 obtains the second adjusted luminance in the luminance lookup table according to the second luminance. Consequently, the luminance and chrominance adjustment are performed.

Then, step S122 is performed. The processing module 14 determines whether each process pixel of the image information is adjusted. If not, step S114 to step S120 are repeatedly performed to adjust the process pixels of the image information.

Comparing with the prior art in which the three components of the color space are separately looked for, in the image processing method of the invention, a group of adjusted luminance and chrominance are obtained in only one flow path via the chrominance-luminance lookup table. When the ratio of the luminance and the chrominance in each process pixel is not 1:1, the luminance lookup table is also looked up to generate the second adjusted luminance. Therefore, it corresponds to multiple format of the images, and different LUTs may be fully used to improve the processing speed.

Then, in the image processing method and the image processing system 1, step S124 is further performed to reset the parameters (St, Sa). When the image processing system 1 determines that the adjusted image information does not satisfy the requirement, or the user updates the parameter by himself or herself via the input module 16, the parameter (St, Sa) may be reset. Therefore, in the image processing method and the image processing system 1, step S102 to S122 may be reperformed. According to the set parameters, the calculating module 12 reestablishes the luminance lookup table and the chrominance-luminance lookup table. Then, the processing module 14 may adjust the image information according to the reestablished luminance lookup table and the reestablished chrominance-luminance lookup table.

To sum up, in the image processing method and the image processing system, a chrominance-luminance lookup table is established to adjust a luminance and a chrominance in a single flow path. As a result, the processing flow path is simplified, and processing time is saved.

Although the present invention has been described in considerable detail with reference to certain preferred embodiments thereof, the disclosure is not for limiting the scope of the invention. Persons having ordinary skill in the art may make various modifications and changes without departing from the scope. Therefore, the scope of the appended claims should not be limited to the description of the preferred embodiments described above.

What is claimed is:

1. An image processing method adapted to processing image information with multiple process pixels, the image processing method comprising the steps of:

setting a group of parameters and establishing a luminance lookup table (LUT);

establishing a chrominance-luminance LUT according to the parameters and the luminance LUT;

retrieving and determining a format of the image information; and generating an adjusted chrominance and a first adjusted luminance corresponding to one of the process pixels using the chrominance-luminance lookup table if the format of the image is a first format, and generating an adjusted chrominance, a first adjusted luminance and a second adjusted luminance corresponding to one of the process pixels using the chrominance-luminance lookup table and the luminance lookup table if the format of the image is a second format.

2. The image processing method according to claim 1, wherein each process pixel having the first format includes a chrominance and a first luminance, and if the format of the image is the first format, the step of generating the adjusted chrominance and the first adjusted luminance using the chrominance-luminance lookup table comprises:
  looking up the chrominance-luminance lookup table according to the chrominance and the first luminance corresponding to one of the process pixels; and
  obtaining the adjusted chrominance corresponding to the chrominance and the first adjusted luminance corresponding to the first luminance in the chrominance-luminance lookup table.

3. The image processing method according to claim 2, wherein in the process pixels having the first format, two process pixels forms a macro pixel, and each macro pixel corresponds to two adjacent pixels of the image information.

4. The image processing method according to claim 2, wherein the first format is an YCbCr format of the color space and an YCbCr sampling ratio is 4:2:2.

5. The image processing method according to claim 1, wherein if the format of the image is the first format, the method further comprises the step of:
  generating the adjusted chrominance and the first adjusted luminance corresponding to each process pixel via the chrominance-luminance lookup table until multiple process pixels of the image information are adjusted.

6. The image processing method according to claim 1, wherein each process pixel having the second format includes a chrominance, a first luminance and a second luminance, and the step of generating the adjusted chrominance, the first adjusted luminance and the second adjusted luminance using the chrominance-luminance lookup table and the luminance lookup table if the format of the image is the second format comprises:
  looking up the chrominance-luminance lookup table according to the chrominance and the first luminance corresponding to one of the process pixels;
  obtaining the adjusted chrominance corresponding to the chrominance and the first adjusted luminance corresponding to the first luminance in the chrominance-luminance lookup table;
  looking up the luminance lookup table according to the second luminance corresponding to one of the process pixels; and
  obtaining the second adjusted luminance corresponding to the second luminance from the luminance lookup table.

7. The image processing method according to claim 6, wherein in the process pixels having the second format, two process pixels form a macro pixel, and each of the macro pixels corresponds to four adjacent pixels of the image information.

8. The image processing method according to claim 6, wherein the second format is the YCbCr format of the color space and the YCbCr sampling ratio is 4:2:0 or 4:1:1.

9. The image processing method according to claim 1, wherein if the format of the image is the second format, the method further comprises the step of
  generating the adjusted chrominance, the first adjusted luminance and the second adjusted luminance corresponding to each process pixel using the chrominance-luminance lookup table and the luminance lookup table until multiple process pixels of the image information are adjusted.

10. The image processing method according to claim 1, further comprising the steps of:
  resetting the parameters;
  reestablishing the luminance lookup table and the chrominance-luminance lookup table according to the reset parameters; and
  adjusting the image information according to the reestablished luminance lookup table and the reestablished chrominance-luminance lookup table.

11. An image processing system comprising:
  a memory module storing an image information, wherein the image information with multiple process pixels;
  a calculating module electrically connected to the memory module, wherein the calculating module establishes a luminance lookup table according to a group of parameters, establishes a chrominance-luminance lookup table according to the parameters and the luminance lookup table and stores the luminance lookup table and the chrominance-luminance lookup table in the memory module; and
  a processing module electrically connected to the memory module, wherein the processing module retrieves the image information from the memory module and determines the format of the image information, if the format of the image is a first format, the processing module uses the chrominance-luminance lookup table stored in the memory module to generate an adjusted chrominance and a first adjusted luminance corresponding to one of the process pixels, and if the format of the image is a second format, the processing module uses the chrominance-luminance lookup table and the luminance lookup table stored in the memory module to generated an adjusted chrominance, a first adjusted luminance and a second adjusted luminance corresponding to one of the process pixels.

12. The image processing system according to claim 11, wherein each process pixel having the first format includes a chrominance and a first luminance, the processing module looks up the chrominance-luminance lookup table according to the chrominance and the first luminance corresponding to one of the process pixels to obtain the adjusted chrominance corresponding to the chrominance and the first adjusted luminance corresponding to the first luminance in the chrominance-luminance lookup table.

13. The image processing system according to claim 12, wherein the first format is a YCbCr format of the color space and a sampling ratio is 4:2:2.

14. The image processing system according to claim 12, wherein the processing module uses the chrominance-luminance lookup table to generate the adjusted chrominance and the first adjusted luminance corresponding to each process pixel until the process pixels in the image information are adjusted by the processing module.

15. The image processing system according to claim 11, wherein each process pixel having the second format includes a chrominance, a first luminance and a second luminance, the processing module looks up the chrominance-luminance lookup table according to the chrominance and the first luminance corresponding to one of the process pixels, and obtains the adjusted chrominance corresponding to the chrominance, and the first adjusted luminance corresponding to the first luminance in the chrominance-luminance lookup table, and the processing module looks up the luminance lookup table according to the second luminance corresponding to one of the process pixels to obtain the second adjusted luminance corresponds to the second luminance in the luminance lookup table.

16. The image processing system according to claim 15, wherein the second format is a YCbCr format of the color space and a YCbCr sampling ratio is 4:2:0 or 4:1:1.

17. The image processing system according to claim 15, wherein the processing module uses the chrominance-luminance lookup table and the luminance lookup table to generate the adjusted chrominance, the first adjusted luminance and the second adjusted luminance corresponding to each of the process pixels until the process pixels of the image information are adjusted by the processing module.

18. The image processing system according to claim 11, further comprises:
an input module electrically connected to the calculating module, wherein the input module sets the parameters according to the operation of a user.

19. The image processing system according to claim 11, when the parameters are reset, the calculating module reestablishes the luminance lookup table and the chrominance-luminance lookup table according to the reset parameters and stores the luminance lookup table and the chrominance-luminance lookup table in the memory module, and the processing module uses the reestablished luminance lookup table and the reestablished chrominance-luminance lookup table to adjust the image information.

* * * * *